United States Patent [19]

Izard et al.

[11] Patent Number: 5,047,120

[45] Date of Patent: Sep. 10, 1991

[54] METHOD FOR MANUFACTURE OF LIGHTWEIGHT FROTHED MINERAL WOOL PANEL

[75] Inventors: David G. Izard, Wauconda; Mark H. Englert, Buffalo Grove, both of Ill.

[73] Assignee: USG Interiors, Inc., Chicago, Ill.

[21] Appl. No.: 352,324

[22] Filed: May 11, 1989

Related U.S. Application Data

[63] Continuation-in-part of Ser. No. 218,415, Jul. 11, 1988, abandoned.

[51] Int. Cl.⁵ ............................................. D21H 3/00
[52] U.S. Cl. .................................... 162/101; 162/152; 162/158; 162/168.1; 162/169; 162/181.1; 162/181.6; 162/208
[58] Field of Search ............... 162/101, 152, 208, 217, 162/168.1, 169, 181.1, 202, 156, 145, 181.6

[56] References Cited

U.S. PATENT DOCUMENTS

| 1,841,785 | 1/1932 | Bryant | 162/101 |
| 2,772,603 | 12/1956 | Waggoner | 162/101 |
| 3,804,706 | 4/1974 | Kurashige et al. | 162/168.1 |

FOREIGN PATENT DOCUMENTS

| 787649 | 6/1968 | Canada | 162/101 |
| 1129757 | 10/1968 | United Kingdom | 162/101 |

*Primary Examiner*—Peter Chin
*Attorney, Agent, or Firm*—Robert M. Didrick; Robert H. Robinson

[57] ABSTRACT

Low density mineral wool structural panels are manufactured by frothing a dilute aqueous dispersion of mineral wool, lightweight aggregate, binder and a small amount of amine-based cationic surfactant onto a nonwoven scrim cover sheet, dewatering the mass and drying it. The froth is a mass of weakly resilient bubbles that rapidly dewater and burst to concentrate the solids in the mass. The bubbles are readily broken without loss of the voided structural configuration by a first application of brief pulses of high vacuum followed by further dewatering under vacuum and rapid drying by passing large volumes of air through the voided mass without collapse of the structure to result in lightweight structural mineral wool panels.

11 Claims, 2 Drawing Sheets

METHOD FOR MANUFACTURE OF LIGHTWEIGHT FROTHED MINERAL WOOL PANEL

This application is a continuation-in-part of application Ser. No. 07/218,475 filed July 11, 1988, now abandoned.

1. Field of the Invention

This invention relates to mineral wool fibrous products. More particularly, it relates to a method of making strong structural panels of mineral wool fiber that are lightweight, about 5-12 pounds per cubic foot density, and which may be used as acoustical ceiling tiles, thermal insulating panels, sound absorbing panels, pipe and beam insulation and the like products.

2. Description of the Prior Art

The water felting of dilute aqueous dispersions of mineral wool and lightweight aggregate is known. By such methods, an about 3 weight % furnish of mineral wool, lightweight aggregate, binder and other adjuvants are flowed onto a moving foraminous support screen for dewatering, such as that of an Oliver or Fourdrinier mat forming maching, at line speeds of about 10-50 feet per minute. The dispersion dewaters by gravity and then vacuum section means; the wet mat is dried over about 3-12 hours in heated convection ovens; and the product cut and optionally top coated such as with a paint, to produce lightweight structural panels such as acoustical ceiling products. Such methods cannot achieve low density products below about 12 pounds per cubic foot.

It is also known to form stable foams with mineral wool. U.S. Pat. No. 4,447,560 suggests a low density insulation sheet may be made by forming a first slurry of fiber containing synthetic rubber latex solids. A second slurry is formed of a detergent, and the two slurries admixed to 15% solids consistency; agitated to a stable foam; and over dried. The extremely time consuming and energy intensive drying of the stable foam from 15% solids is a severe economic detriment.

It has been suggested that lightweight foams of attenuated glass fibers might be formed into very lightweight products of less than 5 pounds per cubic foot density in U.S. Pat. No. 3,228,825. According to this patent, microscopic bubbles are generated and, in order to achieve uniform incorporation of lightweight aggregate and attenuated glass fiber mixtures with the bubbles, a "binder fiber" glue of very highly refined cellulosic fibrilles is required. The proposed product would appear to be an extremely flexible one incapable of structural panel usage. A structural panel, by definition is capable of supporting its own weight without visible sagging, bending, or collapsing when supported only at the edges of the panel. It is believed that this proposed process has never been commercialized or found to be of practical interest.

Further, it is known that paper webs constituted mainly be noble cellulose fibers and fibrilles may be formed from foams. The basic formation of the cellulose fiber manufacture gives rise to highly fractured fiber fragments and fibrilles having a jagged, fuzzy, microstructured surface to aid entanglement and entrapment of microscopic sized foam bubbles.

Further, U.S. Pat. No. 4,062,721 discloses addition of a surfactant foaming agent to a mineral fiber furnish. The addition is after the furnish is in the flow head box in order that minimum foam be present in the sheet as it is laid on the mat forming wire and during an initial gravity drainage period. This is followed by conventional convection drying over long times. It teaches that addition of the foaming agent to the slurry in the mixing tank is unsatisfactory as requiring excessively long drainage times to maintain a satisfactory production rate.

It is an object and advantage of the present invention to provide low density structural mineral fiber panels on a moving foraminous support wire but without having to dry very large amounts of water out of a wet mass.

Another object is to provide a method for rapidly draining and rapidly drying such panels.

Another object and advantage of the present invention is to provide very low density yet strong structural panels, such that panels having a density in the general range of about 5-12 pounds per cubic foot may be provided having a modulus of rupture of at least about 30 psi.

A further object and advantage is the provision of a method for the manufacture of lightweight mineral panels wherein the dewatering and drying may be accomplished in a facile, rapid manner, such that a wet froth mat of substantial thickness is dewatered and dried in a matter of a few minutes.

The above objects and advantages, and others which will become more apparent from the ensuing descriptions, are based upon a combination of the peculiar rheology of weak aqueous froths or foams coupled with a high volume through-air drying. Basically, in accordance with the present invention, a weakly resilient, and therefore fairly unstable mass of bubbles of from about 1/64 to about 1/16 inch diameter comprising about 15-45% by volume of air and that exhibit rapid drainage is generated between the mixing tanks and the mat forming wire. This is in contrast to a stable foam, wherein bubble size is very small and uniform, with each bubble behaving as a stable, rigid sphere when subjected to stresses. The resilient, tightly packed spheres in a stable foam exhibit a great degree of resistance to deformation and exhibit a high viscosity or resistance to dewatering of the liquid film of the bubble when acted upon by small stress forces and are slow to drain liquid from the film. In the present invention, transistory bubbles are generated with the aid of a cationic amine-based surfactant and rapidly dewater during a maturing period under quiescent conditions in a first, flooded section of the forming wire. The highly voided mass of rapidly dewatering bubbles is formed upon at least one pervious woven or non-woven mesh or scrim.

The mass of bubbles must at first be resistant to compression as the weight of the water and of the solids pulls down on the fibrous mass during free gravity drainage. As the weight of the mat decreases due to drainage, the bubbles must coalesce and then break to leave behind an open structure which will not collapse under the stress of high vacuum and high velocity air streams. Compression of the mat is, of course, no longer a problem when the bubbles disappear and leave voids through which the air may pass easily. Absent the maturation of the bubbles, the weight of air pressing down upon the mat when a high vacuum is created under the mat would compress the mat to an undesirably high density. Coalescence occurs when the froth of fragile, weakly resilient air bubbles is present in the generating mass such that air constitutes about 30-45% by volume of the mass. It is believed, at this point, the preferred binder constituents have coated the fiber and aggregate surfaces and have become sufficiently tacky at entangled fiber and aggregate contact points as to retain the open, porous structural configuration of the highly voided entaglement of fibers with lightweight aggregate and a scrim cover sheet upon collapse of the bubbles. Upon application of sufficient stress, such as by brief application of high vacuum suction equivalent to about 4–20 inches of mercury, the shock bursts the bubble walls and the tacky binder further coats the contact points of the entanglement of fiber, aggregate and scrim in the highly voided mass as additional liquid drains from the wet mass. This provides further wet structural integrity to the panel and allows a rapid through-air drying of the panel.

DESCRIPTION OF THE PREFERRED EMBODIMENTS

Figure 1:
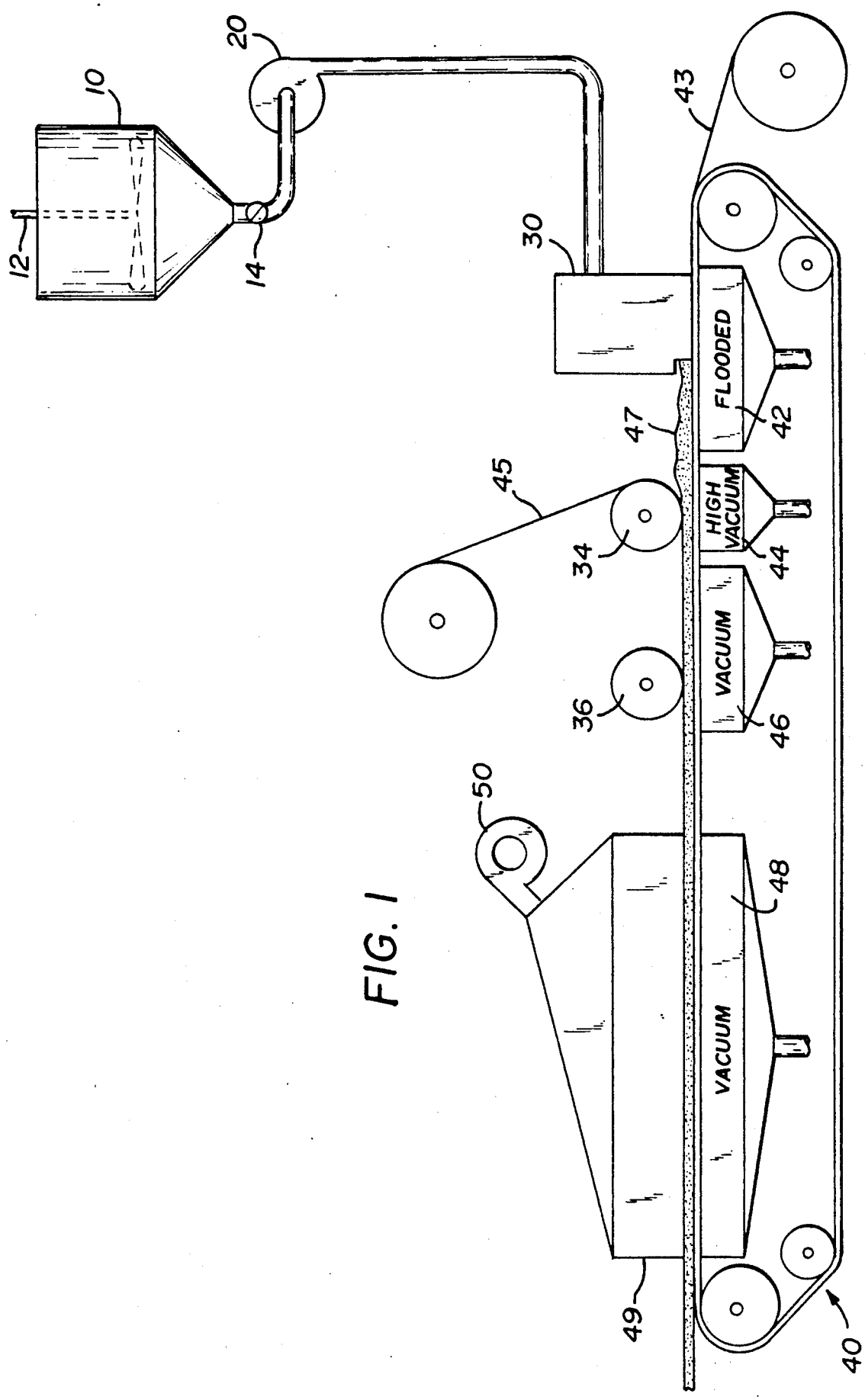
FIG. 1 is a simplified schematic diagram of a frothed mineral board manufacturing process in accordance with the present invention.

The applicants have now discovered a process for rapidly forming fibrous products such as acoustical ceiling board and the like structural board products which combine low densities with good strengths. In accordance with the present invention, a modified wet process is employed wherein the dilute aqueous slurry is foamed to a delicate froth, which froth dewaters and matures under quiescent conditions and is then ruptured by a first vacuum shock to a sufficiently porous, open structure that is capable of being rapidly and economically stripped of water and dried by further vacuum and the passage of heated air through the opened porous structure.

The products made according to the process of the invention are fibrous products. The fibers may be inorganic or organic, whether natural or synthetic, or combinations of the foregoing. Typical fibers useful in the present invention include organic fiber such as polyester, polyamide and polyolefin fibers; and mineral fibers such as mineral wool, glass wool, and other conventional fibers. The preferred fiber for the present invention is predominantly mineral fiber composition such as blown mineral wool. Expressed in terms of the dry by weight total solids content of the board composition, the fibers are suitably present in an amount of about 20–65% by weight, and preferably present in an amount of about 30–40% by weight.

An essential solid ingredient is an inorganic lightweight aggregate of exfoliated or expanded mineral of volcanic origin generally having a dry loose bulk density of about 2–6 pounds per cubic foot (pcf) such as of exfoliated vermiculite, expanded perlite, and the like. Particle sizes of the lightweight aggregate are generally about 12 to about 100 mesh. Preferred lightweight aggregate comprises expanded perlite having a top size of about 100 mesh (150 micrometers) with about 73% of the particles passing 425 mesh (32 micrometers). The lightweight aggregate may be present in an amount by weight dry total solids basis of about 20–70% and preferably about 30–40%.

Another essential solid ingredient is the binder. The binder may be any of the conventionally used binders but organic resin latexes are preferred. Suitable resin latexes include polyvinyl acetate, vinyl acetate/acrylic copolymers, and styrene-butadiene. Various homopolymer, copolymer and mixtures thereof may be used. Generally the binder will constitute about 5–30% by weight of the dry board composition. Only about one-fourth to about one-half of binder added in initial formulation of the furnish will be retained in the wet mass on the screen. The remainder passes through the screen with the drainage water. Thus the furnish to the forming wire may contain about 5–50 weight % of latex solids to allow for losses through the wire. Polyvinyl acetate latexes are particularly suitable, and when employed, a small amount of polyvinyl alcohol, such as about 1–10% by weight of the emulsion, may be added as a suspension aid and to enhance the bonding strength of the resin.

The other essential ingredient is a cationic surfactant frothing aid which, in combination with the foregoing ingredients in water, will generate delicate, rapidly draining bubbles. Such surfactant is a weakly foaming cationic amine-based surfactant having at least one long chain (8–22 carbon atoms) aliphatic radical. Such amine materials include primary and secondary amines such as cocoamine and disoyamine; fatty diamines and their salts such as tridecylether amine acetate; polyethanoxy derivatives such as cocoamine having about 16 moles of ethyxylation; alkyl ether amines such as hexyloxyropylamine, decyloxypropylamine, octyl ether amine, decyl ether amine, octyl ether amine acetate, decyl ether amine acetate and isodecyl ether amine acetate; and quanternary ammonium salts such as cocotrimethyl ammonium chloride. Quaternary ammonium compounds are preferred as providing fairly homogeneous bubbles. The frothing aid may be added in quite variable amounts depending upon the effect desired and the foam producing level of the particular cationic amine-based surfactant utilized. Generally amounts may satisfactorily range from about 0.2% to about 2.5% by weight based upon total solids of the dry panel product.

Optionally the furnish composition may include some coarse cellulose fibers to aid cohesiveness of the core of the panel. Such fibers, conveniently derived by slushing newpaper in a high shear high intensity mixer, are generally about 1/16–¼ inch in length with some fibers being up to about an inch long. If present, they may be added in amounts up to about 15% by weight total dry solids, preferably less than about 5% and most preferably less than about 3% by weight is added.

In carrying out the process of the present invention, a dilute fiber furnish of about 1–5% solids consistency is formed, in one or more mixing vessels, comprising mineral fibers, lightweight aggregate, binder and a small amount of cationic amine-based surfactant and agitated to a froth. All of the ingredients may be added to a single mixing vessel preferably adding the cationic amine surfactant frothing aid last. It is preferred to add the aggregate and the frothing aid in later mixers if a plurality of mixers is used. It is believed that the bubble formation with the surfactant is aided by a residual amount of surfactants customarily present in the latex binder, and bubble attachment to mineral surfaces is enhanced by the cationic surfactant. The general froth is laid upon, and/or overlaid with a previous, woven or nonwoven fiber facing sheet on the moving foraminous wire. The froth is allowed to age and mature for a few seconds time under essentially quiescent conditions, over a flooded section of the wire to a point where the liquid has an about 10-30% solids consistency. It is believed at this point that the binder has become sufficiently tacky to retain the structural configuration of the highly voided entanglement of mineral fibers, lightweight aggregate and the cover sheet upon collapse of the bubbles. Upon application of stress such as by brief application of high vacuum (providing a pressure differential equivalent to about 4-20, and preferably 4-14, inches of mercury) the bubbles burst, further dewatering the highly voided mass, which is then stripped of remaining water a by continued pressure differential of about 5-20 inches of water (about 0.37-1.5 inches of Hg) and dried by passing air through the mat (at a rate of about 50-350 cubic feet per minute per square foot of the mat surface at which the air is blown) to produce a structural mineral wool panel having a density of about 5-12 pounds per cubic foot and flexural strengths of about 30 to 45 pounds per square inch for the core (excluding top and bottom cover sheets). A preferred procedure is to maintain a substantially constant vacuum of about 4 to 6 inches of mercury during the froth breaking and stripping process.

EXAMPLE 1

The following Example should be read with references to FIG. 1 which shows a simplified process diagram in accordance with the present invention.

A dilute mineral fiber furnish was prepared by charging mineral wool, perlite, a coarse paper fiber aqueous slurry from pulping unprinted fly leaf in a slush maker, a 45% solids dispersion of X-LINK 2828 polyvinyl acetate resin latex from the National Starch and Chemical Corporation, ADOGEN 461 cocotrimethyl ammonium chloride from the Sherex Chemical Company and water for suspension to mix tank 10 equipped with motor driven impeller 12 and valve 14. Flows from the mix tank were adjusted by valve 14 to provide a total 3% solids consistency furnish proportioned on a dry solids basis to about 33% perlite, about 33% mineral wool, about 15% coarse paper fiber, about 15% polyvinyl acetate and about 1.5% quaternary ammonium chloride.

Figure 2:
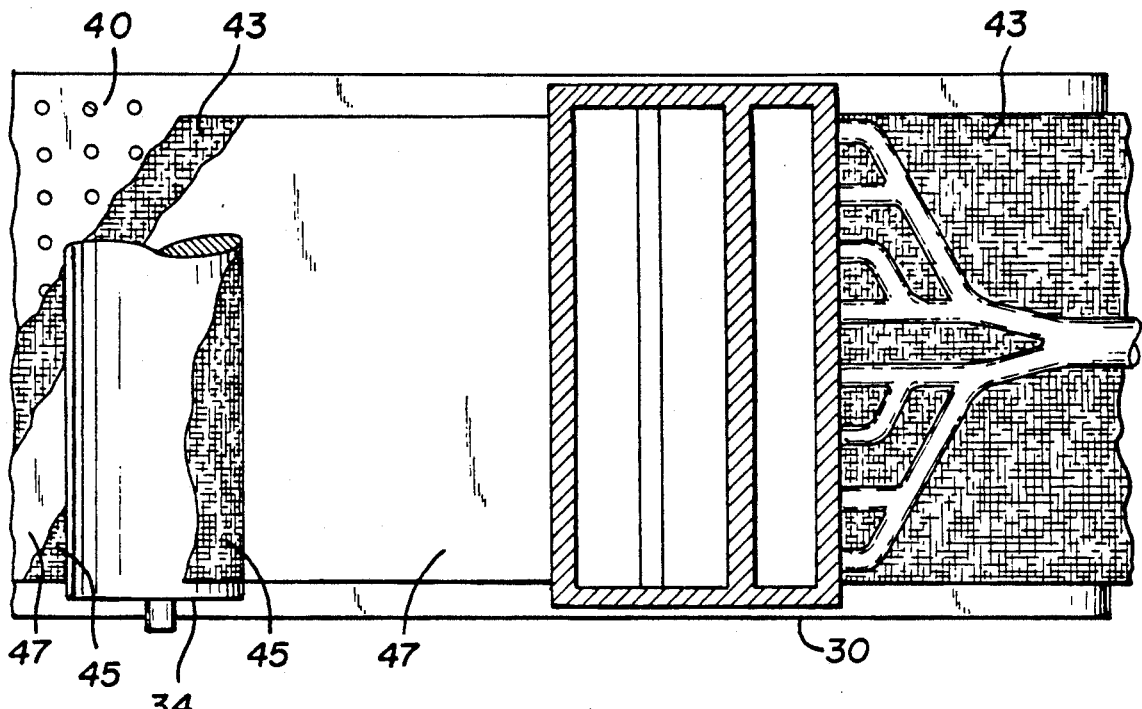
FIG. 2 is a top view cross section of the process showing the frothing head forming box apparatus of FIG. 1.
Figure 3:
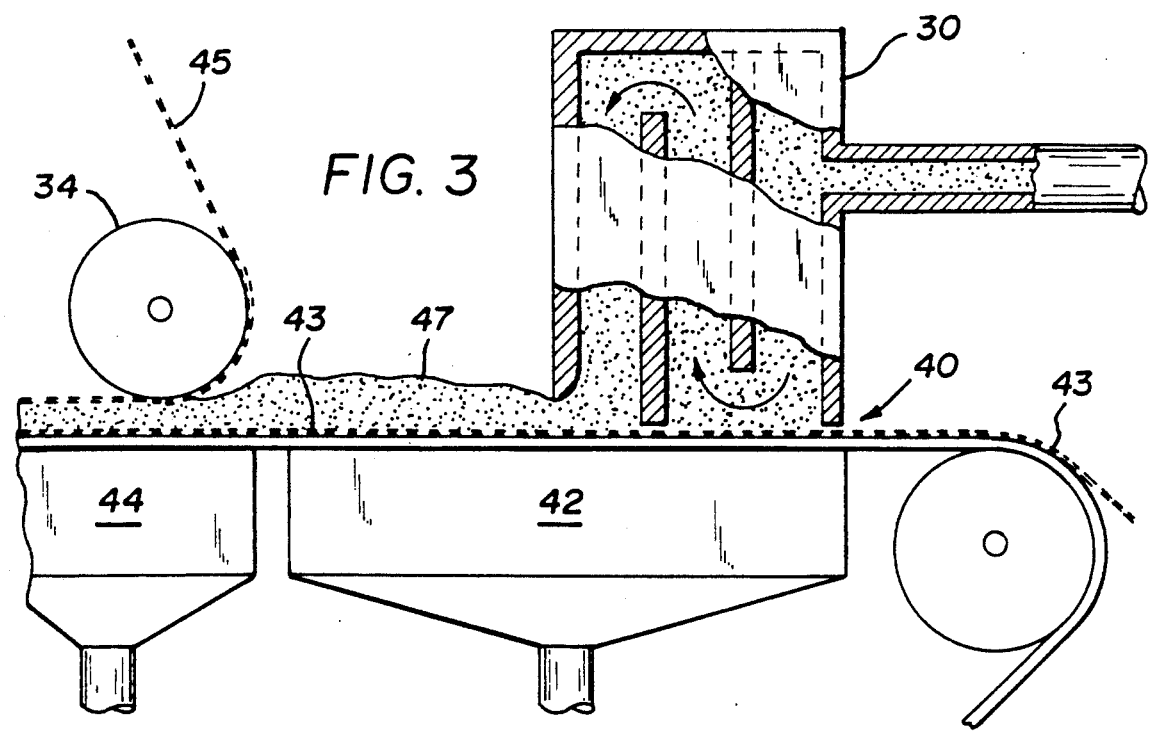
FIG. 3 is a side view sectional of the same portion of the process as FIG. 2.

A pump 20 transferred the homogeneous mixing furnish to a modified flow head box 30 on a conventional moving foraminous support wire belt, commonly referred to as the wire 40. The functions of the modified head box 30 are to allow the furnish now developing to a froth of bubbles to age, consolidate and mature the solids in the frothing mass for a few seconds and to apply an even layer of dewatering froth solids across the width of wire 40. The enlarging and then convoluting channelization to and through the modified head box as more particularly shown in FIGS. 2 and 3, enhances this maturation and consolidation of the developing froth. By providing smoothing roller 34 on wire 40, a velocity transition zone to a flooded first section 42 on the wire 40 was established to allow further maturation and consolidation of the foam.

A continuous bottom cover sheet 43 such as of nonwoven Battery scrim having a weight of 0.8-2 pounds per hundred square feet was laid onto wire 40 before the foaming mass cascaded out of the head box 30. Also, preferably, a top sheet 45 of the same scrim was overlaid onto the foaming mass. Feeding the top cover sheet 45 under smoothing roll 34 and then under caliper roll 36 provided an intimate contacting of sheet 45 to the core foam mass 47 and assisted in smoothing out the surfaces of the core mass 47.

The froth cascading out of head box 30 was deposited upon and then floated through flooded section 42 for about a second before encountering the vacuum sections 44, 46 and 48. In high vacuum section 44, a vacuum pressure differential equivalent to about 14 inches of mercury was applied across the froth to burst the bubbles and strip water from the wet mass without collapsing the open, voided structure of the mass 47. In vacuum section 46 a pressure differential equivalent to about 14 inches of water (about 1 inch of Hg) was maintained and in vacuum section 48 it was lessened and augmented with positive pressure dry air heated to about 200° F. and passed through the mass 47 by blower 50 of drier 49 providing a velocity of 150 cubic feed per minute per square foot of the top surface of the mat. The time for a section of froth to pass through section 48 was about ten minutes. Conventional oven drying would have required about 3 hours.

The resulting panel from section 48 was nominal ½ inch thickness and composed of a center core 47 of uniformly distributed voids averaging about 1/16-1/64 inch diameter between the two scrim cover sheets 43 and 45. The panel had a density of about 6.5 pounds per cubic foot and was quite strong although flexible. In fact, the core was tested after stripping off the top scrim cover sheet and found to have a modulus of rupture of about 30 pounds per square inch and modulus of elasticity of about 5,700 pounds per square inch.

In further evaluations the amount of perlite was varied between about 26% and about 43%. The amount of mineral wool used was varied in an opposite manner by the same amount so that the sum of the perlite and mineral wood accounted for 66% by weight of the total solids of the furnish. It was found that increases in the perlite-to-mineral wool ratio yielded a progressively lighter, weaker and more flexible core in linear fashion. On a weight basis, the strength of the core remained relatively constant when these values were corrected for the various densities of the samples using a squared density relationship. It was also found that about 2% of the perlite processed through the line became broken and settled out on the bottom facing sheet. Also the flooded section 42 contained about one-half to three-fourths of the polyvinyl acetate added in the mix tank. Of course, recycling water from the flooded section 42 to the mix tanks 10 eliminated this potential loss of binder. Various finished core thicknesses from about ⅛ inch through 1 inch or more may be provided.

EXAMPLE 2

In a series of laboratory evaluations a number of cationic amine-based surfactants were evaluated for floating an expanded perlite containing a generally unfloatable fraction of shattered, crushed shard amount to about 14% by weight of the perlite sample. The perlite was formed into a 1% dispersion with water by mixing for one minute in a Lightnin Model V-7 propeller mixer at a mixing setting of 40 with loading levels of the surfactant between 0.5 and 1.5% by weight. The following were found to lower the unfloated fraction down to the range of 2-5% unfloated at this surfactant loading level:
Primary Amine and Secondary Amine
　ARMEEN C—Cocoamine
　ARMEEN SD—Soyamine
Alkyl Ether Amine
　ADOGEN 180—$C_{10}$ ether amine ADOGEN 183—$C_{13}$ ether amine
AROSURF MG—70A3 isodecyl ether amine acetate
AROSURF MG—70A5 $C_{10}$ ether amine acetate
AROSURF MG—98A3 $C_{8-10}$ ether amine acetate
Tomah PA—10 hexyloxypropylamine
Tomah PA—14 decyloxypropylamine
Fatty Diamine
AROSURF MC—83A tridecyl ether diamine acetate
Ethoxylated Amine
AROSURF MG—160 ethoxylation grade cocoamine
Tomah E—14—2 ethoxylated fatty amine
Quaternary Ammonium Salt
ADOGEN 461 cocotrimethyl ammonium chloride

EXAMPLE 3

The general procedure of Example 1 is followed except that a substantially constant vacuum of about 4-6 inches of mercury is drawn during the froth breaking and initial stripping procedure. A lesser vacuum of about 8-14 inches of water is used during the final stripping and drying procedure.

What is claimed is:

1. A method of manufacturing a lightweight structural mineral panel on a moving foraminous support wire comprising:
   A. Forming a dilute fiber furnish in water of mineral fiber and organic resin latex binder;
   B. Mixing said furnish and a small amount of cationic amine-based surfactant frothing aid that contains at least one long chain aliphatic radical of $C_8$-$C_{22}$ carbon atoms effective to form a transitory froth of air bubbles;
   C. Depositing the froth on a water flooded section of the support wire;
   D. After a brief interval of time sufficient for the froth to mature into a mass of bubbles of about 1/64-1/16 inch diameter, applying a vacuum pressure differential to the froth equivalent to from about 4 to about 20 inches of mercury to burst the bubbles and strip water from the wet mass;
   E. Stripping additional water from the wet mass by applying a pressure differential to the wet mass equivalent to about 5-20 inches of water; and
   F. Drying the wet mass by passing air through the wet mass at a rate of about 50-350 cubic feet per minute per square foot of the surface of the mass at which the air is directed.

2. The process of claim 1 in which said binder is polyvinyl acetate latex.

3. The process of claim 1 in which said furnish comprises by weight of total solids about 20-65% fiber, about 20-70% lightweight aggregate, and about 5-50% binder.

4. The process of claim 1 in which said furnish comprises by weight of total solids about 30-40% fiber, about 30-40% lightweight aggregate, and about 10-30% binder.

5. The process of claim 1 in which said furnish comprises by weight of total solids about 20-65% mineral wool, about 20-70% expanded perlite and about 5-30% polyvinyl acetate.

6. The process of claim 1 in which in step D brief pulses of vacuum are applied to the froth.

7. The process of claim 1 in which in step D the pressure differential is equivalent to about 4-6 inches of mercury.

8. The process of claim 1 in which said surfactant is a quaternary ammonium compound.

9. The process of claim 1 in which said surfactant is a quaternary ammonium chloride.

10. The process of claim 1 in which said surfactant is cocotrimethyl ammonium chloride.

11. A method of manufacturing a lightweight structural mineral fiber panel on a moving foraminous support wire comprising the steps of:
   A. Forming a dilute fiber furnish in water including by weight of total solids about 20-65% mineral fiber, about 20-70% expanded perlite, and about 5-30% polyvinyl acetate;
   B. Mixing said furnish with about 0.2% to about 2.5% by weight of a cationic amine-based surfactant frothing aid that contains at least one long chain aliphatic radical of $C_8$-$C_{22}$ carbon atoms to form a transitory froth of air bubbles;
   C. Depositing the froth on a water flooded section of the support wire;
   D. Applying to the froth brief pulses of high vacuum pressure differential equivalent to from about 4 to about 20 inches of mercury to burst the froth bubbles and strip water from the wet mass;
   E. Stripping additional water from the wet mass by applying a vacuum pressure differential to the wet mass equivalent to from about 5 to about 20 inches of water; and
   F. Drying the wet mass by passing air through the mass at a rate of about 150-350 cubic feet per minute of air per square foot surface area of the mass.

* * * * *